United States Patent [19]

Föhl

[11] Patent Number: 5,005,909

[45] Date of Patent: * Apr. 9, 1991

[54] FORCE-LIMITING ENERGY ABSORBER FOR SAFETY BELT SYSTEMS

[75] Inventor: Artur Föhl, Schorndorf, Fed. Rep. of Germany

[73] Assignee: TRW Repa GmbH, Fed. Rep. of Germany

[*] Notice: The portion of the term of this patent subsequent to Feb. 27, 2007 has been disclaimed.

[21] Appl. No.: 386,512

[22] Filed: Jul. 27, 1989

Related U.S. Application Data

[62] Division of Ser. No. 202,803, Jun. 3, 1988, Pat. No. 4,904,023.

[30] Foreign Application Priority Data

Jul. 17, 1987 [DE] Fed. Rep. of Germany ....... 3723772

[51] Int. Cl.$^5$ .............................................. A62B 35/04
[52] U.S. Cl. ..................................... 297/472; 297/468
[58] Field of Search ............... 297/216, 471, 472, 468, 297/470, 464; 188/371; 280/801, 805; 267/69, 73, 153, 182

[56] References Cited

U.S. PATENT DOCUMENTS 3,361,475  1/1968  Villiers .

FOREIGN PATENT DOCUMENTS 1877850  4/1963  Fed. Rep. of Germany .
1531516  12/1969  Fed. Rep. of Germany .
2233421  1/1974  Fed. Rep. of Germany .
1327488  12/1970  United Kingdom .

*Primary Examiner*—Kenneth J. Dorner
*Assistant Examiner*—Brian K. Green
*Attorney, Agent, or Firm*—Tarolli, Sundheim & Covell

[57] ABSTRACT

The force-limiting energy absorber for safety belt systems comprises a series of stretch members lying one behind the other in the direction of the tensile stress. Each stretch member comprises an opening which is surrounded by a border deformable under a tension load. In the openings limiting elements are disposed which limit in abutment manner the deformation of the border transversely of the direction of the tensile stress. The limiting elements may be made mushroom-shaped and integrally formed on the border of the stretch members.

1 Claim, 2 Drawing Sheets

FORCE-LIMITING ENERGY ABSORBER FOR SAFETY BELT SYSTEMS

This is a divisional of copending application Ser. No. 202/803 filed on 6/3/88, now U.S. Pat. No. 4,904,023.

The invention relates to a force-limiting energy absorber for safety belt systems comprising a series of stretch members which are arranged one behind the other in the direction of the tensile stress and which each comprise an opening surrounded by a border deformable under tensile load.

In known force-limiting energy absorbers of this type the stretch members arranged in a row in the direction of the tensile stress have a form whose lateral border is formed by two symmetrically opposite wave lines. Correspondingly, the openings of the stretch members are made up of two bell-shaped portions lying in laterally inverted symmetry with respect to the longitudinal direction. Under tensile stress the stretch members are stretched in the longitudinal direction to absorb by material deformation part of the kinetic energy liberated in a collision and limit the tension occurring in the belt system.

The present invention offers a solution to the problem of providing an energy absorber which has a uniform profile of the tensile force/stretch length characteristic free from fluctuations over the entire intended length of the stretching occurring under tensile stress in such a force-limiting energy absorber. This is achieved by the provision of limiting elements disposed in the openings of the stretch members to limit the deformation of the deformable border portions of the stretch members transversely of the direction of the tensile stress, by abutment of the limiting elements on each other.

It has proved extremely difficult to make the aforementioned problem compatible with the requirement of making the failure load of the energy absorber large enough, taking account of a safety margin. With an energy absorber designed for a high load at rupture the stretching of the stretch members does not start until relatively high tensile stresses occur at which a force limitation is already desired. If, however, the stretch members are designed so that a stretching occurs even at relatively low tensile stresses there is a danger of premature failure or breakage.

The limiting elements disposed in the openings of the stretch members in accordance with the invention provide a controlled deformation of the stretch members. The stretching starts at relatively low tensile stresses and continues until the lateral border of the openings of the stretch members comes to bear on the limiting elements, thus preventing necking of the stretch members. It has been found that with stretch members without limiting elements in their openings a necking of the stretch members occurs at about the level of their centre and due to this necking a particularly high material stress arises because an originally convex configuration has been deformed to a concave configuration. This high local material stress results in premature breakage. The limiting elements provided according to the invention prevent a high local stress so that the border of the stretch members can be designed for a deformation starting even at relatively low tensile stresses.

It has further been found that a particularly high load at failure can be achieved with simultaneously low values for the tensile stress at which the stretching starts if the two border faces of the openings of the stretch members opposite each other in the transverse direction extend at least approximately straight and parallel in the direction of the tensile stress. It has been found that with this configuration a particularly uniform deformation is achieved over the entire periphery of the stretch members.

Particularly advantageous embodiments of the invention are set forth in the subsidiary claims.

Further features and advantages of the invention will be apparent from the following description of several embodiments with the aid of the drawings, wherein:

FIG. 1 perspective view of a first embodiment of the force-limiting energy absorber;

Figure 1:
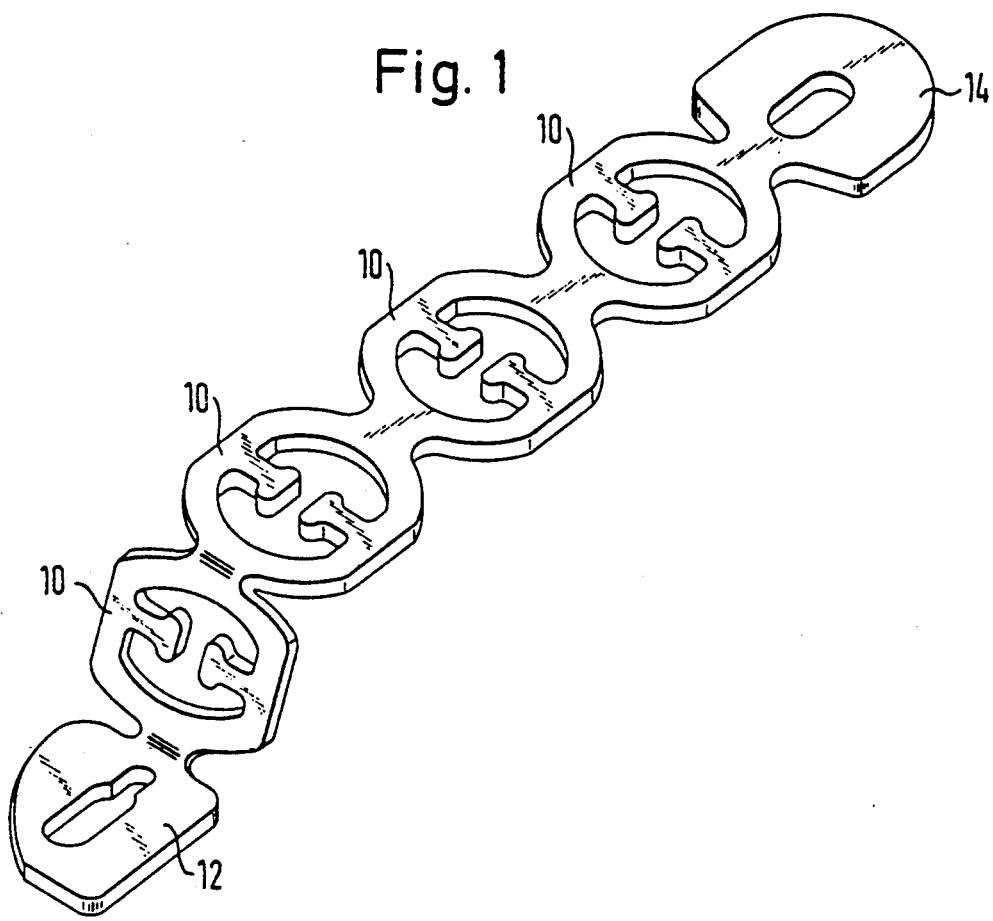
Figure 2:
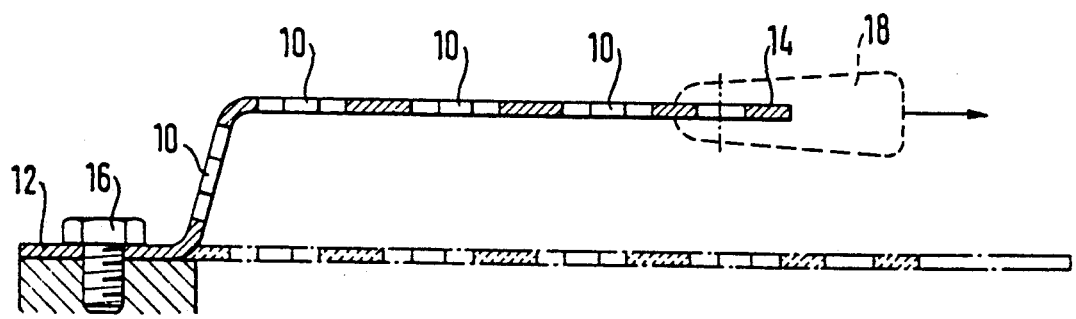
FIG. 2 is a schematic longitudinal section of the energy absorber shown in FIG. 1 mounted in a vehicle.

In the embodiment of the force-limiting energy absorber shown in FIG. 1 four stretch members 10 are arranged in a row between two securing fittings 12, 14. The stretch members 10 and the securing fittings 12, 14 are stamped from sheet metal. As is apparent from FIG. 2 the energy absorber is bent at its end adjacent the securing fitting 12 to permit suitable arrangement in a vehicle. The securing fitting 12 is secured by means of a screw 16 to the vehicle whilst to the securing fitting 14 a belt lock 18 shown schematically in FIG. 2 is secured. The energy absorber may however fundamentally be inserted at any desired point of the belt system.

Figure 3:
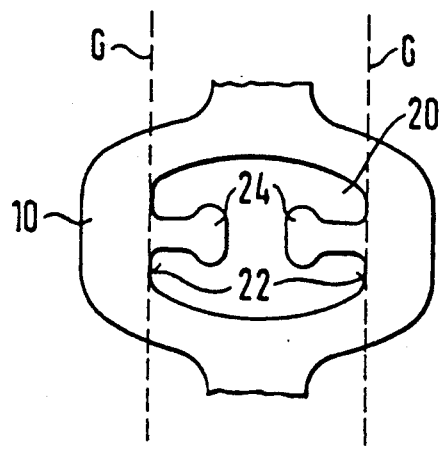
FIG. 3 is a schematic illustration of a stretch member of an energy absorber in the original state.
Figure 4:
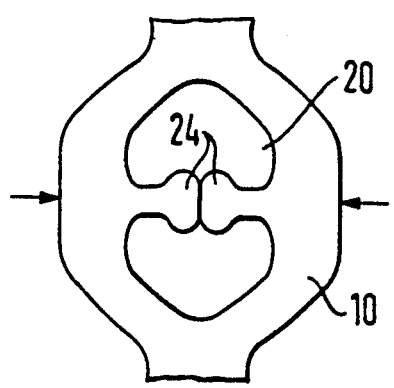
FIG. 4 is a schematic view of the same stretch member after a tensile stress.
Figure 5:
FIG. 5 is a diagram showing the stretch length as a function of the tensile stress for the force-limiting energy absorber according to the invention.

FIG. 3 illustrates the particular features of the energy absorber of the embodiment shown in FIG. 1. The stretch member 10 has generally the form of an ellipse which is flattened at its opposing longitudinal ends. Each stretch member 10 comprises a central opening 20, the shape of which, like the shape of the stretch member as a whole, corresponds to an ellipse flattened at its longitudinal ends. The lateral border faces 22 of the opening 20 are approximately straight and extend parallel to the longitudinal direction of the energy absorber. This is illustrated in FIG. 3 by two dashed straight lines G. At each lateral border face 22 a mushroom-shaped limiting element 24 is integrally formed. Said mushroom-shaped limiting elements 24 extend from the centre of the associated border face 22 inwardly and with their heads lie opposite each other at a predetermined distance apart. This distance is dimensioned so that the heads of the limiting elements 24 after a tensile stress bear against each other up to the maximum intended tensile load. This state is shown in FIG. 4. After the tensile stress the stretch member 10 has been stretched by a predetermined amount in the longitudinal direction. This amount corresponds in the diagram shown in FIG. 5 to the stretch length S between the points I and II under the action of the tensile force F. In FIG. 4 it is indicated by two lateral arrows that at the level of the centre of the stretch member 10 after the tensile stress has taken place no necking has occurred. Such a necking would result in a high local material stress which can lead to premature breakage. The limiting elements 24 result in the desired uniform deformation of the border of the opening 20 without necking of the stretch member and without high local material stresses.

The gradual increase of the tensile force F lying in the diagram of FIG. 4 in front of the abscissa point I results from stretching of the energy absorber shown in FIGS. 1 and 2 in the region of the bent portion behind the securing fitting 12. This stretching operation is illustrated in dashed lines in FIG. 2.

At the abscissa point II a relatively rapid rise of the tensile force F as a function of the stretch distance S occurs. The failure limit is at tensile forces F which are considerably larger than the tensile force associated with the abscissa point II. Between the abscissa points I and II the variation of the tensile force F is very uniform. An irregular variation in this region would result in high acceleration stresses of the vehicle occupants secured by the belt system.

Figure 6:
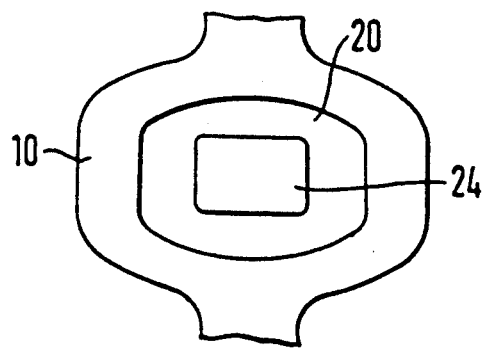
FIG. 6 is a schematic illustration of a further embodiment of a stretch member of the energy absorber.

Whereas in the embodiment shown in FIGS. 1 to 4 the limiting elements 24 are integrally formed at the border of the stretch members in the embodiment of FIG. 6 separate limiting elements 24 are provided. Said limiting elements 24 are held centrally in the opening 20 by suitable means. In practical embodiments the energy absorber preferably stamped from sheet metal is provided with a covering. Such a covering can be employed to fix the limiting elements 24 in the interior of the openings 20. An advantageous embodiment in which the stretch members 10 are provided with a plastic covering by injection moulding therearound resides in that the limiting elements 24 are embedded in the plastic composition.

I claim:

1. A force-limiting energy absorber for a safety belt system, said force-limiting energy absorber comprising:
   two end fittings;
   a deformable element connected with said end fittings, said deformable element including first and second side portions which are spaced apart for at least a portion of their length to at least partially define an opening, said first and second side portions being deformable under the influence of a tensile load transmitted between said two end fittings through said first and second side portions;
   a limiting element in each opening located longitudinally centrally of the side portions as measured in the direction of tensile load and having a surface portion spaced from said side portions for abutting another surface portion located longitudinally centrally of said side portions as measured in the direction of tensile load to limit the combined distance through which said first and second side portions of said deformable element move during deformation to a distance which is substantially less than a transverse dimension of the opening as measured along a line extending perpendicular to a longitudinal axis extending between said two end fittings through said deformable element prior to deformation of said deformable element under the influence of a tensile load transmitted between said two end fittings.

* * * * *